Aug. 14, 1962

J. J. RACKIS ETAL
SOYBEAN TRYPSIN INHIBITORS AND METHOD
OF ISOLATING THE SAME 3,049,530

Filed Aug. 25, 1959

3 Sheets-Sheet 1

Fig. I

JOSEPH J. RACKIS
ALLAN K. SMITH
INVENTORS

BY
R. Hoffman
ATTORNEY

Aug. 14, 1962    J. J. RACKIS ETAL    3,049,530
SOYBEAN TRYPSIN INHIBITORS AND METHOD
OF ISOLATING THE SAME
Filed Aug. 25, 1959    3 Sheets-Sheet 3

JOSEPH J. RACKIS
ALLAN K. SMITH
INVENTORS

BY
R. Hoffman
ATTORNEY

United States Patent Office 3,049,530
Patented Aug. 14, 1962

3,049,530
SOYBEAN TRYPSIN INHIBITORS AND METHOD OF ISOLATING THE SAME
Joseph J. Rackis and Allan K. Smith, Peoria, Ill., assignors to the United States of America as represented by the Secretary of Agriculture
Filed Aug. 25, 1959, Ser. No. 836,044
2 Claims. (Cl. 260—123.5)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes is hereby granted to the Government of the United States of America.

This invention pertains to the discovery and commercially practicable isolation from soybean whey of a newly identified crystalline protein of the globulin type which inactivates the proteolytic action of trypsin and which is, therefore, called a trypsin inhibitor.

The term, "soybean whey," as used in the art, refers to the liquid residue after the isoelectric separation of certain protein constituents from an aqueous extract of hexane-extracted soybean meal.

This invention further pertains to a commercially practicable method of fractionation which provides a presently commercially unavailable completely pure form of Kunitz trypsin inhibitor.

Soybean trypsin inhibitor (Kunitz), J. Gen. Physiol., 29, 149 (1946), ibid., 30, 291 (1947) is a well known material which sells for about $40 per gram and is widely used in assaying the activity of trypsin and for other biological purposes. However, despite the fact that commercial Kunitz trypsin inhibitor is a 5-times-recrystallized product, we have found that it comprises about 10 percent of biologically inactive material (peak $C_1$ of FIGURE 1). The presence of inactive material in the commercially available Kunitz trypsin inhibitor is also shown by our finding that the extinction coefficient, E, of the pure substance is 1.04 whereas that of the commercial product is 0.85. With our especially adapted chromatographic elution technique we have obtained a commercially practicable pure Kunitz trypsin inhibitor (peak B of FIGURE 1) and have at the same time obtained a second hitherto unisolated even more active trypsin inhibitor in pure form (peak A of FIGURE 1).

For brevity we shall designate our newly isolated soybean trypsin inhibitor as SBTI-$A_1$, pure Kunitz soybean trypsin inhibitor as SBTI-$A_2$, and the commercially available Kunitz soybean trypsin inhibitor as SBTI-$(5\times)$.

Figure 1:
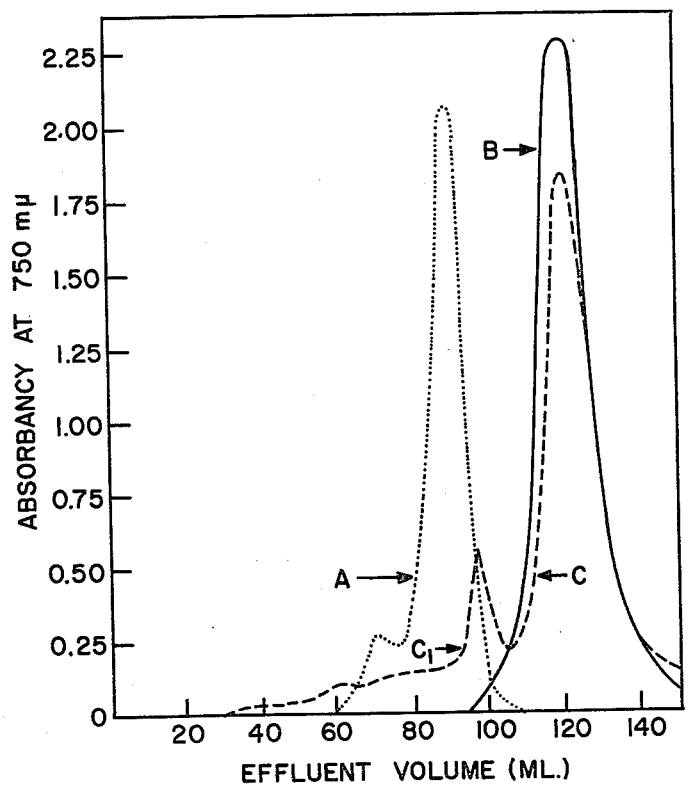
Figure 2:
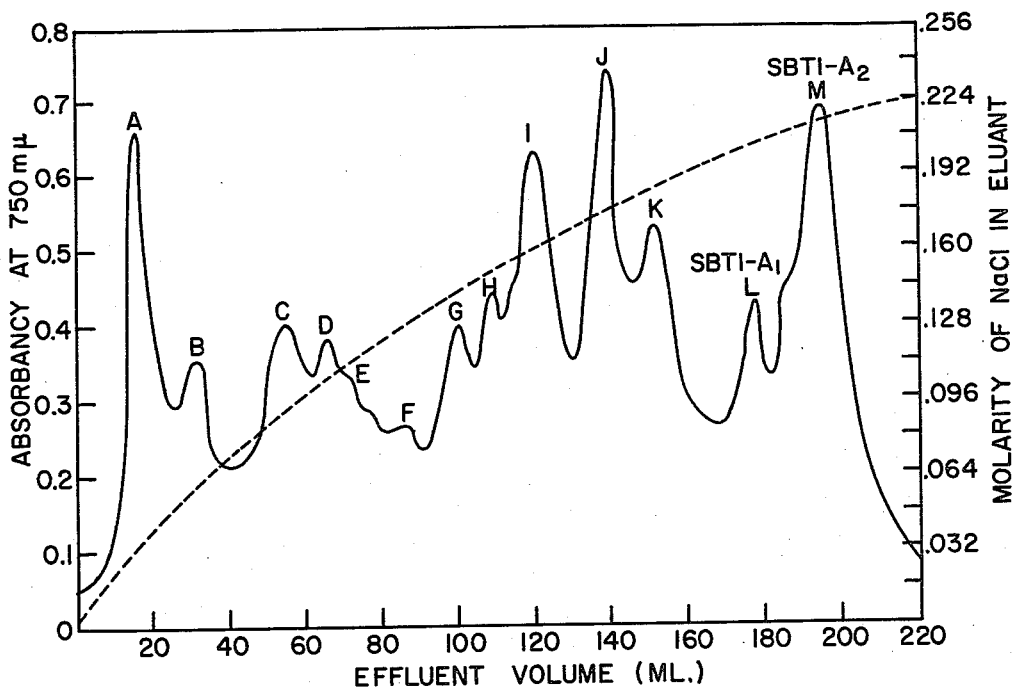

Previous electrophoretic studies on soybean whey proteins have indicated the presence of at least five distinct components, Smith et al., J. Am. Oil Chemists Soc., 32, 274 (1955). Also 2 resolvable peaks appear in ultracentrifuge patterns, corresponding to components with $S_{20}W$ values of approximately 2S and 6S (W. J. Wolf, Ph. D. Dissertation, Univ. of Minn., 1956). However, these values do not represent single proteins since biological tests show that soybean whey contains a heat-coagulable protein, trypsin inhibitor, hemagglutinin, and a number of enzymes. By analyses of the successive fractions obtained by gradient chromatographic elution, we have determined that there are in fact at least 13 electrophoretically distinct components in soybean whey, as shown in FIGURE 2. Conventional moving boundary electrophoresis of soybean whey does not disclose or isolate SBTI-$A_1$ for the newly discovered reason that SBTI-$A_1$ and SBTI-$A_2$ complex with each other to give a resultant mobility value of 7.6 rather than their respective individual values of 7.96 and 7.17. FIGURE 1 shows our chromatographic resolution of a mixture containing equal parts of SBTI-$A_1$ (curve A) and SBTI-$A_2$ (curve B) with a reference curve of SBTI-$(5\times)$ (curve C), which comprises protein contaminants subordinately indicated as curve $C_1$.

In addition to the electrophoretic evidence obtained from the gradient elution fractions, ultracentrifuge values further confirm the distinctiveness of SBTI-$A_1$ from SBTI-$A_2$. We have found that the $S_{20}W$ value of the newly isolated SBTI-$A_1$ is 1.75S while that of pure SBTI-$A_2$ is 2.29S. Also, compared with a specific activity reference value of 1.00 for SBTI-$A_2$, SBTI-$A_1$ has an anti-tryptic activity of 1.28.

Our invention comprising the isolation of SBTI-$A_1$ by a commercially practicable process, which incidentally also isolates SBTI-$A_2$ in pure form, is the outgrowth essentially of electrophoretic, ultracentrifuge, and extinction coefficient studies on serially collected 1 ml. effluents obtained with gradient elution using 0.0 M–0.3 M sodium chloride in 0.01 M phosphate buffer, pH 7.6, from a diethylaminoethyl cellulose column containing adsorbed soybean whey. FIGURE 2 shows the resolution of the protein components of soybean whey following gradient elution. Of the peaks, which are identified alphabetically, only L which is SBTI-$A_1$) and M (which is SBTI-$A_2$) are retained in the process of our invention. The separation of effluent fractions containing the soybean whey proteins corresponding to these specific peaks is discussed below and in the example.

We have discovered that substantially quantitative yields of pure SBTI-$A_2$ and of the newly isolated SBTI-$A_1$ can be separately obtained in a small series of stepwise elutions of the soybean whey from a buffer-equilibrated diethylaminoethyl (DEAE) cellulose column employing as eluants certain critical molar concentrations of sodium choride in 0.01 phosphate buffer, pH 7.6. Briefly, an elution with 0.03 M sodium chloride in buffer and a succeeding elution with buffer containing 0.13 M sodium chloride are discarded as containing unadsorbed protein and peak I of FIGURE 3 (peaks A–G of FIGURE 2). Elution is then uninterruptedly continued with buffer containing 0.17 M NaCl, somewhat less than the first half of the corresponding effluent being discarded as containing the components represented by peak II of FIGURE 3 (peaks H–K of FIGURE 2). The remainder of the 0.17 M salt eluant is preserved since it represents peak III of FIGURE 3 (peak L of FIGURE 2) and contains SBTI-$A_1$. Elution is continued with buffer containing 0.25 M salt and again somewhat less than the first half of the corresponding effluent is discarded. The remaining effluent, representing peak IV of FIGURE 3 (peak M of FIGURE 2) contains the pure SBTI-$A_2$. The desired fractions are freed of salt by dialysis and concentrated or dried by obvious means. It is obvious that commercial recovery of the phosphatases, soybean hemagglutinin, and $\beta$-amylase present in the discard effluents would be also facilitated.

*Example 1*

Figure 3:
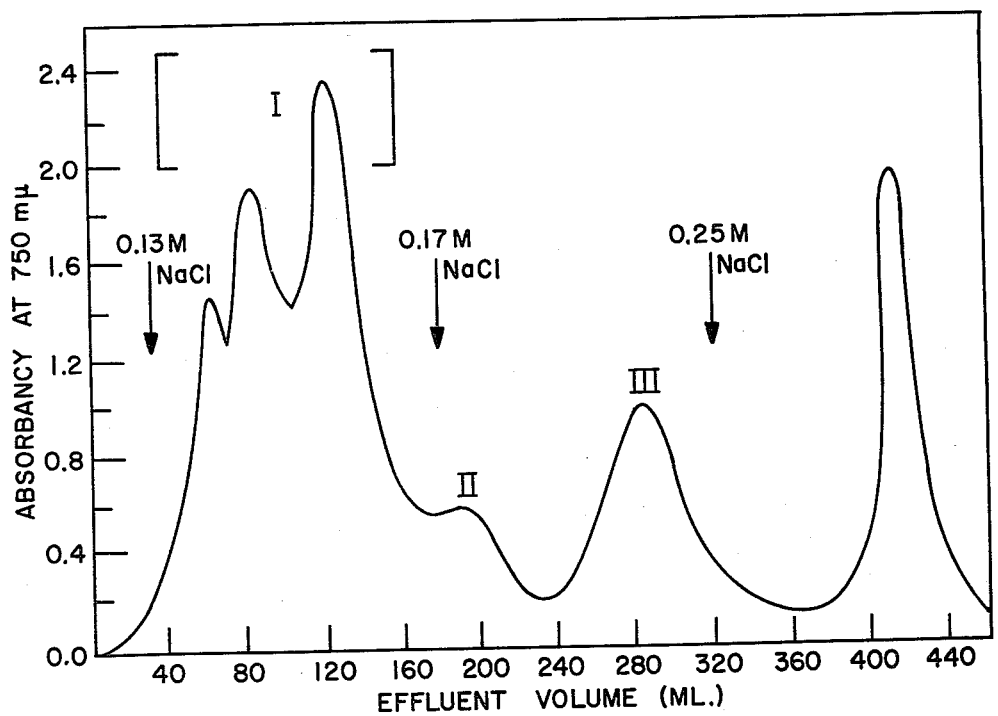

An anion exchange column was prepared containing a 0.01 molar phosphate buffer slurry of 11 grams of buffer-equilibrated reagent grade diethylaminoethyl cellulose. The dimensions of the prepared column were 2.2 cm. by 25.0 cm. The column was charged with 1.8 gm. of soybean whey proteins in phosphate buffer. Elution at the rate of 50 ml. per hour into a constant-volume fraction collector was begun upon the addition to the column of 30 ml. of 0.034 M sodium chloride in buffer solution. This was followed by the addition of 150 ml. of a 0.13 M sodium chloride solution in the buffer. The corresponding effluent represented peak I (FIGURE 3) and was discarded. The 0.13 M salt eluant was followed by the addition of 140 ml. of an 0.17 NaCl dissolved in the buffer. The initial 60 ml. of corresponding effluent was discarded since it represented peak II (FIGURE 3). The succeeding 80 ml. of effluent was retained since it contained the SBTI-$A_1$ (peak III of FIGURE 3). Then 140 ml. of 0.25 M salt in phosphate buffer solution was added to the column, and the first 40 ml. of corresponding effluent was discarded since it represented only peak III (FIGURE 3). The remaining 60 ml. of of effluent, representing peak IV of FIGURE 3 was retained since it contained the SBTI-$A_2$. Both retained fractions were separately dialyzed overnight in distilled water and then were lyophilized to dry powders. The purities of the 2 fractions were confirmed by re-chromatography and moving boundary electrophoresis at 2° C. The yields exceeded 95 percent of theory.

Having thus fully disclosed our invention, we claim:

1. A method for obtaining soybean trypsin inhibitor fractions from soybean whey which comprises providing a diethylaminoethyl cellulose chromatography column buffer-equilibrated with 0.01 M phosphate to pH 7.6; passing soybean whey through the column to cause proteins in the whey to be adsorbed on said column; stepwise eluting the column first with 0.034 M sodium chloride in 0.01 M phosphate buffer and then with 0.13 M sodium chloride in said buffer to remove unwanted components of the whey from the column; next eluting with 0.17 M sodium chloride in said buffer, approximately the first half of the corresponding effluent being discarded while retaining the remaining fraction; then eluting the column with 0.25 M sodium chloride in said buffer, approximately the first half of the corresponding effluent being discarded while retaining the remaining fraction; separately dialyzing the said retained fractions against distilled water, and separately lyophilizing the dialyzed fractions to recover soybean trypsin inhibitor fractions.

2. A method for obtaining a soybean trypsin inhibitor from soybean whey which comprises providing a diethylaminoethyl cellulose chromatography column buffer-equilibrated with 0.01 M phosphate to pH 7.6; passing soybean whey through the column to cause proteins in the whey to be adsorbed on said column; stepwise eluting the column first with 0.034 M sodium chloride in 0.01 M phosphate buffer and then with 0.13 M sodium chloride in said buffer to remove unwanted components of the whey from the column; then eluting with 0.17 M sodium chloride in said buffer, approximately the first half of the corresponding effluent being discarded while separately collecting and retaining the remaining fraction; and recovering from said retained fraction a soybean trypsin inhibitor having a specific anti-tryptic activity of 1.28 as compared with the specific activity of pure Kunitz soybean trypsin inhibitor and further having a $S_{20}W$ value at pH 7.6 of 1.75S, an electrophoretic mobility value at pH 7.6 of 7.17, and an $E_{(1\ mg.\ protein\ per\ ml.)}$ at 280 m$\mu$ of 1.04 at pH 7.6.

References Cited in the file of this patent

Kunitz: J. Gen. Physiol., 29, 1949 (1946).
Kunitz: Ibid. 30, 291 (1947).
Sober et. al.: J.A.C.S. 78 (756–763), 1956.
Knuchel et al.: C.A. 51, 5262i (1957).
(Copies of above in Patent Office Library.)